United States Patent [19]

Tezuka

[11] Patent Number: 4,816,944

[45] Date of Patent: Mar. 28, 1989

[54] DISC CARTRIDGE LOADING MECHANISM

[75] Inventor: Nobuo Tezuka, Kanagawa, Japan

[73] Assignee: Canon Kabushiki Kaisha, Tokyo, Japan

[21] Appl. No.: 27,107

[22] Filed: Mar. 13, 1987

Related U.S. Application Data

[63] Continuation of Ser. No. 637,393, Aug. 3, 1984, abandoned.

[30] Foreign Application Priority Data

Aug. 9, 1983 [JP] Japan .................... 58-145170

[51] Int. Cl.⁴ .................... G11B 5/016; G11B 17/02
[52] U.S. Cl. ..................... 360/99.02; 360/99.06; 360/133
[58] Field of Search ................ 360/86, 97–99, 360/133, 69, 71, 75; 369/75.2, 77.1; 77.2, 258, 261, 270, 271

[56] References Cited

U.S. PATENT DOCUMENTS

| | | | |
|---|---|---|---|
| 3,480,282 | 11/1969 | Mindell et al. | 369/270 X |
| 4,170,031 | 10/1979 | Beuch et al. | 360/98 |
| 4,315,289 | 2/1982 | Holocek et al. | 360/99 |
| 4,453,188 | 6/1984 | Johnson et al. | 360/133 X |
| 4,466,033 | 8/1984 | Jordan et al. | 360/99 |
| 4,498,161 | 2/1985 | Eisemann | 369/75.2 |
| 4,498,165 | 2/1985 | Wilkinson | 369/270 |
| 4,523,240 | 6/1985 | Dunstan et al. | 360/99 |
| 4,536,813 | 8/1985 | Saito | 360/133 X |

FOREIGN PATENT DOCUMENTS

| | | | |
|---|---|---|---|
| 57-167171 | 10/1982 | Japan | 360/97 |
| 58-147854 | 9/1983 | Japan | 369/258 |

Primary Examiner—John H. Wolff
Attorney, Agent, or Firm—Robin, Blecker & Daley

[57] ABSTRACT

A recording and/or reproducing apparatus arranged to use a disc-shaped record bearing medium having an engaging portion which is provided with an engaging hole, including a rotating spindle having a flange and engageable with the hole at the engaging portion of the medium, a recording and/or reproducing head, a moving mechanism for moving the head relative to the medium, a pressing member for pressing the engaging portion of the medium against the flange of the spindle, and a control system responsive to the moving mechanism for causing the pressing member to operate and thereafter disabling the pressing member when the moving mechanism moves the head from a reset position to a predetermined position.

16 Claims, 5 Drawing Sheets

DISC CARTRIDGE LOADING MECHANISM

This is a continuation of application Ser. No. 637,393, filed Aug. 3, 1984, now abandoned.

BACKGROUND OF THE INVENTION

1. Field of the Invention:

The present invention relates to a recording and/or reproducing apparatus in which, a disc-shaped record bearing medium is used.

2. Description of the Prior Art:

In the case of a recording and/or reproducing apparatus for recording and/or reproducing information with use of a record bearing medium such as a rotary magnetic disc, it is important to mount the record bearing medium on a rotation driving shaft correctly and securely in order to avoid eccentricity of the like. If the record bearing medium is not correctly mounted on the rotation driving shaft, the facing of a recording and/or reproducing head with the record bearing medium is not perfect (for example, a spacing loss increases). Or, in the case of eccentricity, a deviation occurs between the head and a track, and the recording or reproducing property becomes inferior, which is problematic.

In order to avoid the above difficulty, a method in which a pressing member is used to press the record bearing medium against a conical part which is provided on a record bearing medium rotating shaft has been proposed. However, according to this method, the record bearing medium is always pressed against the conical part of the driving shaft and the pressing member rotates together with the record bearing medium, so that the moment of inertia of the rotating portion increases and also the size of a motor for driving the rotating shaft increases, which is disadvantageous for a compact apparatus.

In order to avoid the above disadvantage, as described later, an apparatus has been proposed in which: a plastic center hub having an engaging hole for engaging with a rotating driving shaft is provided at a central portion of a flexible magnetic disc, and a spring portion for side pressure is formed on a part of the hole, so as to obtain side pressure between the driving shaft and the center hub; and at a lower part of the center hub a magnetizable plate such as one made of iron is secured, while at a flange portion of the driving shaft for determining a height of a disc relative to a recording and/or reproducing head a permanent magnet is disposed, so as to effect chucking of the disc by the magnetic attracting force between the magnetizable plate and the permanent magnet.

However, even in the case of the above method, for example, when the side pressure of the spring portion formed in the engaging hole of the center hub is low, eccentricity of the disc is apt to occur. Conversely when the side pressure is high, chucking by the attracting force between the magnetic plate of the center hub and the permanent magnet at the side of the rotating driving shaft becomes uncertain. In order to obtain a sure chucking, the permanent magnet has to be made large, which means that the load for the motor is increased, and therefore the motor as well, has to be made large, which is disadvantageous.

SUMMARY OF THE INVENTION

It is, accordingly, an object of the present invention to provide a recording and/or reproducing apparatus arranged in such a manner that the above-mentioned uncertain chucking of the disc-shaped record bearing medium in the conventional apparatus is eliminated, and the record bearing medium can be mounted securely on the rotation driving shaft with a simple construction, and when the record bearing medium is rotated there will be no superfluous load given to the rotation driving shaft.

It is another object of the present invention to provide a recording and/or reproducing apparatus capable of sure chucking of the record bearing medium onto the rotation driving shaft, in association with an operation needed for recording or reproduction.

Under these objects, according to the preferred embodiment embodying the aspect of the present invention, a recording and/or reproducing apparatus arranged to use a disc-shaped record bearing medium having an engaging portion, comprises rotating means engageable with the medium at its engaging portion and having a surface for receiving the engaging portion of the medium; head means for recording signals on and/or reproducing recorded signals from the medium; moving means for moving the head means relative to the medium; pressing means for pressing the engaging portion of the medium against the receiving surface of the rotating means; and control means for controlling the pressing means in response to the moving means.

In the embodiment, the control means is arranged to cause the pressing means to operate and thereafter disable the same when the moving means moves the head from its reset position to a predetermined position.

Further objects and features of the present invention will be apparent from the following detailed description of preferred embodiments with reference to the accompanying drawings.

BRIEF DESCRIPTION OF THE DRAWINGS

Below, preferred embodiments of the present invention are described with reference to the accompanying drawings, in which.

DETAILED DESCRIPTION OF THE PREFERRED EMBODIMENTS

Figure 1:
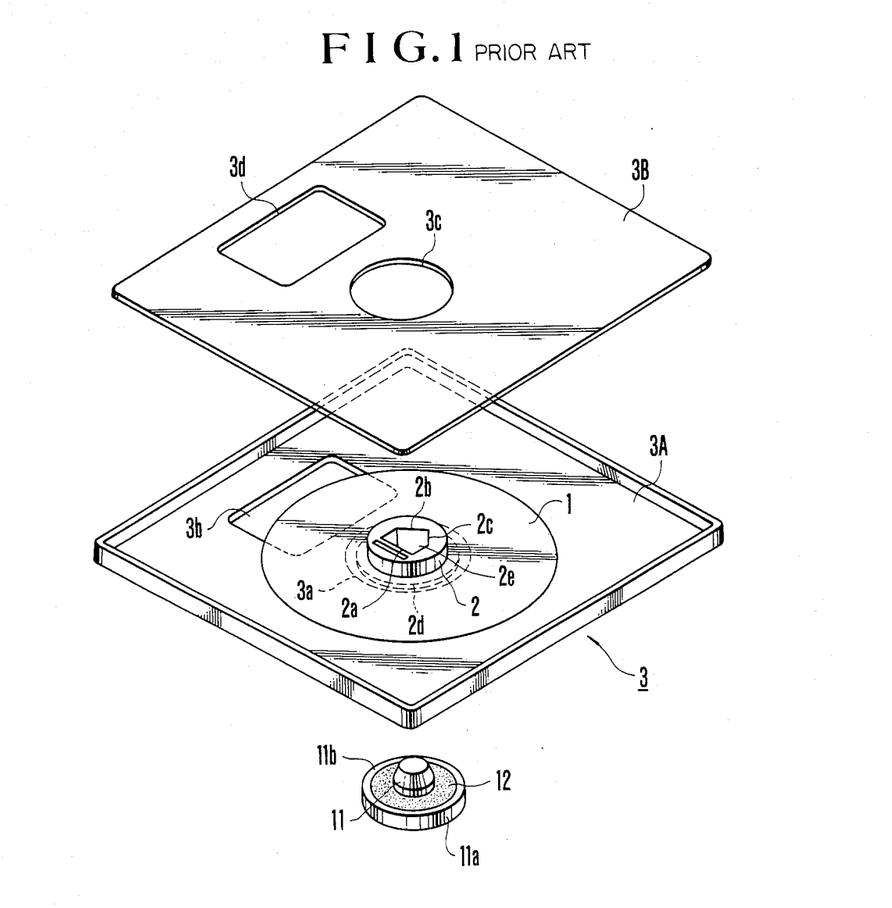
FIG. 1 is an exploded perspective view showing the construction of a magnetic cassette and of a disc rotating spindle of a conventional recording and/or reproducing apparatus.

Prior to the description of embodiments of the present invention, an example of the above-mentioned conventional recording and/or reproducing apparatus will be described with reference to FIG. 1. According to the conventional apparatus, a flexible magnetic disc as a record bearing medium is mounted on a driving shaft by the side pressure and the magnetic attraction force between a center hub secured at a central portion of the disc and the driving shaft. In FIG. 1, 1 is a flexible magnetic disc as an example of a record bearing medium, and 2 is a center hub formed of plastic material and secured onto a central portion of the disc 1. The center hub 2 is provided with an engaging hole 2e defined by a spring portion 2a which acts as a spring member and two tapered portions 2b and 2c which face the spring portion 2a, and an attraction plate 2d made of a magnetizable material such as an iron plate on the back side of the center hub 2. 3A is a lower half of a container, a so-called cassette 3, for containing and protecting the magnetic disc 1, and is provided with an opening 3a into which a driving shaft 11 described below is inserted and an opening 3b into which a magnetic head (not shown) is inserted. Further, in FIG. 1, 3B is an upper half of the cassette 3, 3d is an opening into which a stabilizer plate is inserted, and 3c is an opening for escaping the center hub 2. 11 is a record bearing medium rotation driving shaft formed as a spindle and is provided on a recording and/or reproducing apparatus (not shown). 12 is a permanent magnet provided on a flange portion 11a of the driving shaft 11. A fringe surface 11b of the flange portion 11a serves as a reference plane for determining the height of the disc 1 relative to the head.

Below, the operation of the apparatus will be described. When the cassette 3 is loaded at a predetermined position relative to the driving shaft 11 within the recording and/or reproducing apparatus, the attraction plate 2d of the center hub 2 is attracted by the permanent magnet 12. At this time, the two tapered portions 2b and 2c of the engaging hole 2e of the center hub 2 are pressed against a circumferential surface of the driving shaft 11 by the force of the spring portion 2a so as to effect chucking of the center hub 2. Consequently, according to this construction, the driving shaft 11 and the magnetic disc 1 rotate at one unit by the pressure of the center hub 2 against the driving shaft 11 and the attracting force between the permanent magnet 12 and the attraction plate 2d, so that eccentricity is very unlikely to occur due to the effect created between the two tapered portions 2b and 2c of the engaging hole 2e of the center hub 2 and the spring portion 2a, while further, the correct vertical positioning of the magnetic disc 1 relative to the magnetic head can be made by the attraction force of the permanent magnet 12. Also, because of the simple construction of a rotating portion the moment of inertia of a rotation system is low, which is advantageous for a compact apparatus.

However, in the case of the apparatus explained above, in order to mount the disc 1 on the driving shaft 11, the attracting force of the permanent magnet 12 has to overcome the side pressing force of the spring portion 2a of the center hub 2 against the driving shaft 11. However, since the pressing force of the spring portion 2a of the center hub 2 against the driving shaft 11 changes due to the accuracy of a size of the driving shaft 11 itself and its surface condition, or the accuracy of a size of the engaging hole 2e of the center hub 2 itself and the change of the size by the temperature, the humidity, and so on, the disc 1 cannot be mounted securely by means of the attracting force of the permanent magnet 12. On the other hand, if the attracting force of the permanent magnet 12 is strengthened and the pressing force of the spring portion 2a of the center hub 2 is weakened, eccentricity of the disc 1 tends to occur at the time of mounting thereof. For this reason, the fact is that even with the apparatus described above the above-mentioned problems cannot be solved perfectly due to uncertainty in mounting.

According to the present invention, such problems can be solved perfectly. Below, embodiments of the present invention will be described.

Figure 2A:
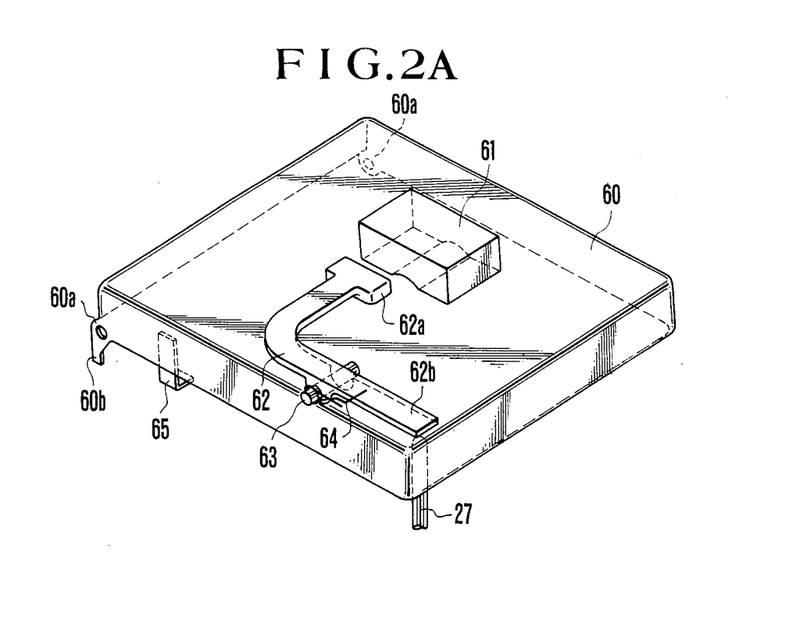
FIGS. 2A, 2B and 2C are perspective views of an outer cover, a cassette holder medium container and a recording and/or reproducing apparatus body respectively, which are essential parts of an embodiment of a recording and/or reproducing apparatus according to the present invention.
Figure 2B:
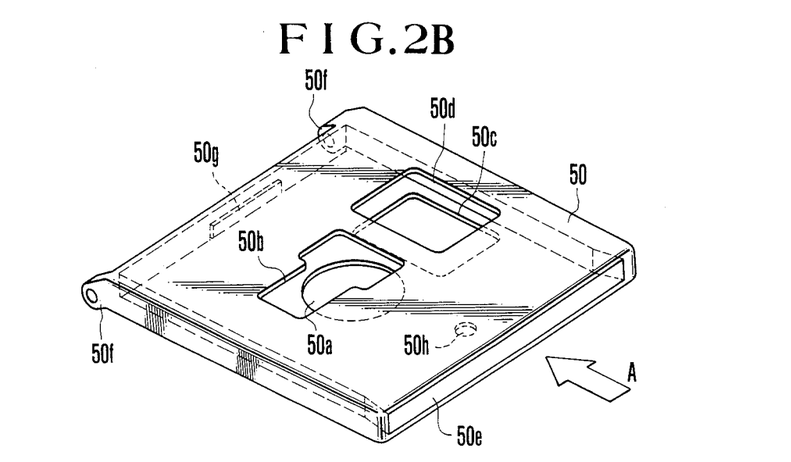
Figure 2C:
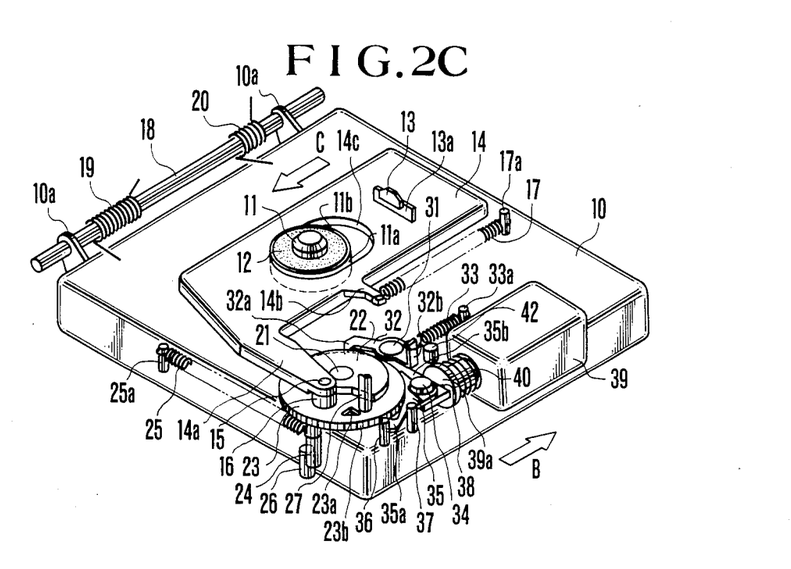

First, referring to FIG. 2C, the reference numeral 10 denotes a recording and/or reproducing apparatus body. 11 is a driving shaft formed as a spindle as an example of a record bearing medium rotation driving portion, which is driven by a motor (not shown) to rotate at a constant speed at the time of recording or reproduction. 12 is a permanent magnet provided on a flange portion 11a of the driving shaft 11. The driving shaft 11 and the permanent magnet 12 are in principle the same as those shown in FIG. 1. 13 is a recording or reproducing head and is secured on a head carrier 14 via a head mounting base plate 13a. The head carrier 14 is guided by guide rails (not shown) or the like and is movable in the direction of an arrow C, whereby the head 13 is moved toward the driving shaft 11, namely, in the radial direction of the disc 1. Further, the head carrier 14 is provided with an opening for escaping the driving shaft 11.

15 is a shaft provided on a tip end of an arm portion 14a of the head carrier 14. 16 is a cam follower roller rotatably supported by the shaft 15. 17 is a spring for urging the head carrier 14 in the direction opposite to the arrow C, which is stretched between another arm portion 14b of the head carrier 14 and a fixed pin 17a. 18 is a hinge shaft supported by ear portions 10a of the body 10 and supports a cassette holder 50 (described later in FIG. 2B) and an outer cover 60 (described later in FIG. 2A) rotatable relative to the body 10. A spring 19 provided on the hinge shaft 18 is arranged to urge the outer cover 60 in the counterclockwise direction relative to the body 10, while a spring 20 provided on the same is arranged to urge the cassette holder 50 in the clockwise direction relative to the outer cover 60.

Figure 3:
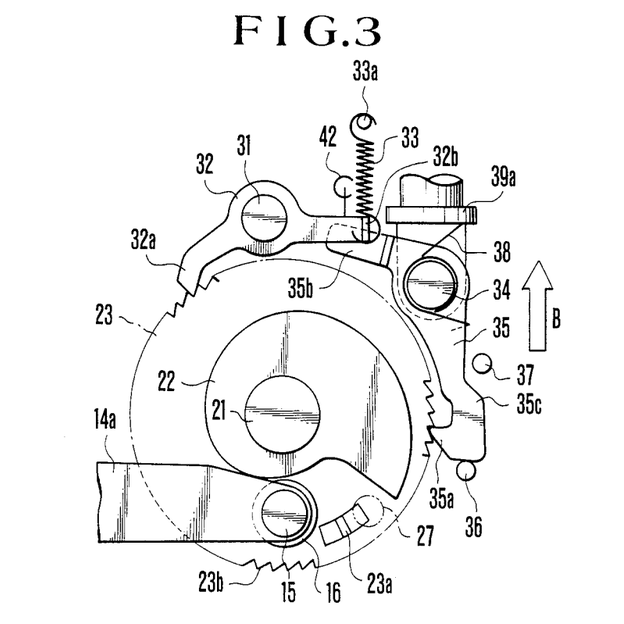
FIG. 3 is an enlarged plan view of head moving means in the apparatus of FIG. 2C.

Here, referring to FIG. 3 also, 21 is a shaft, 22 is a head moving cam, and 23 is a ratchet wheel. The cam 22 is attached to the ratchet wheel 23, and the ratchet wheel 23 is rotatable around the shaft 21. At a predetermined position on an upper surface of the ratchet wheel 23 a convex cam portion 23a is provided, at a circumference of the ratchet wheel 23 ratchet teeth 23b having a predetermined pitch are formed, and on a lower surface of the ratchet wheel 23 a stopper pin 24 is provided 25 is a spring hung between the stopper pin 24 and a fixed pin 25a and urges the cam 22 and the ratchet wheel 23 in the clockwise direction. 26 is a stopper on the side of the body 10 and is arranged to engage with the stopper pin 24. 27 is a connecting rod provided on the body 10 and movable in the axial direction by suitable guide means (not shown), whose lower end faces the upper surface of the ratchet wheel 23, and whose upper end faces a tail end 62b of a pressure member 62 described later (FIG. 2A). The convex cam portion 23a of the ratchet wheel 23 is so positioned that the cam portion 23a engages with the lower end of the connecting rod 27 when the ratchet wheel 23 is rotated counterclockwise. When the ratchet wheel 23 rotates from an initial position described later by a predetermined amount, the connecting rod 27 is moved upwards by the convex cam portion 23a, and when the convex cam portion 23a passes over, the connecting rod 27 resumes the downward position again.

31 is a shaft, 32 is a stop claw, 33 is a spring, and 33a is a spring hanging pin. The stop claw 32 is urged to turn counterclockwise around the shaft 31 by the spring 33. A tip end claw portion 32a of the stop claw 32 engages with the ratchet teeth 23b of the ratchet wheel 23 under the force of the spring 33. 34 is a shaft planted on a tip end of a plunger 39a described later, and on the shaft 34 a driving claw 35 is rotatably supported. 36 is a restriction pin, 37 is a stopper pin provided on the body 10, and 38 is a spring for urging the driving claw 35 in the clockwise direction. A tip end 35a of the driving claw 35 engages with the ratchet teeth 23b of the latchet wheel 23 under the force of the spring 38. 39 (FIG. 2C) is a solenoid whose plunger 39a is urged by a spring 40 in the direction opposite to an arrow B but normally assumes the position shown in the drawing because the tip end 35a of the driving claw 35 is kept in contact with the restriction pin 36. When a current is supplied to the solenoid 39, the driving claw 35 as well as the plunger 39a moves in the direction of the arrow B against the force of the spring 40, but the moving range thereof is limited because an incline portion 35c of the driving claw 35 engages with the stopper pin 37. 42 is a reset pin and normally assumes the position at which it does not engage with an end 32b of the control claw 32 and an end 35b of the driving claw 35.

Next, in FIG. 2B, 50 is a cassette holder into which a record bearing medium container, namely the magnetic disc cassette 3 described in FIG. 1, is inserted. The cassette holder 50 is rotatably supported by the hinge shaft 18 at ear portions 50f of the cassette holder 50 and is urged by the spring 20 to open relative to the outer cover 60. The cassette 3 is inserted into the holder 50 through an opening 50e in the direction of an arrow A. The holder 50 is provided with an opening 50a which the flange portion 11a of the driving shaft 11 enters, an opening 50b which a part of the pressure member 62 described later enters, an opening 50c which the head 13 enters and an opening 50d which a stabilizer plate 61 described later enters. The stabilizer plate operates is to cause the magnetic disc 1 run in a stable manner near the head 13.

Next, in FIG. 2A, 60 is an outer cover, which is rotatably supported by the hinge shaft 18 at ear portions 60a, and is urged by the spring 19 to turn relative to the body 10. The outer cover 60 is provided with the stabilizer plate 61, the pressure member 62, a rotating shaft 63 of the pressure member 62 and an engaging member 65. The pressure member 62 for pressing the center hub 2 of the disc 1 (FIG. 1) against the driving shaft 11 until the attraction plate 2d comes into contact with the fringe surface 11b of the flange portion 11a of the driving shaft 11, is rotatably supported by the shaft 63 and is urged by a spring 64 in the clockwise direction. A tip end pressure portion 62a of the pressure member 62 is able to come into contact with the upper surface of the center hub 2 of the disc 1, while a tail end 62b of the pressure member 62 faces the connecting rod 27. Further, the pressure member 62 has at least partially an elasticity. In this apparatus, the pressure member 62 exemplifies pressing means for pressing an engaging portion of a record bearing medium against a record bearing medium rotation driving portion.

Below, the operation of the apparatus of the above construction will be described. First, the moving operation of the head 13 will be described. In the case of the initial position shown in FIG. 2C or FIG. 3, the stopper pin 24 placed on the lower surface of the ratchet wheel 23 is kept in contact with the stopper 26 on the side of the body 10. In this state, when a current is supplied to the solenoid 39 the plunger 39a is attracted in the direction of the arrow B against the force of the spring 40, so that the driving claw 35 also moves in the same direction until the incline portion 35c comes into contact with the stopper pin 37. When current supply to the solenoid 39 is cut off, the driving claw 35 resumes the position shown in FIG. 2C or FIG. 3. With this operation, the ratchet wheel 23 rotates counterclockwise by one tooth pitch of the ratchet teeth 23b, and at this time the ratchet wheel 23 is kept at this rotation position by the stop claw 32. Repeating this operation, the ratchet wheel 23 and the cam 22 advances intermittently by a pitch of tooth of the ratchet teeth 23b. Therefore, in this case, as a lift of the cam 22 is arranged to accord with a recording track pitch on the recording surface of the magnetic disc 1, the head 13 moves intermittently by one track pitch in the direction of the arrow C with the head carrier 14.

In order to cause the head 13 and the cam 22 return to the initial position, the reset pin 42 is moved downward in the drawing of FIG. 3, for example, in association with the opening of the outer cover 60 or the like. And then the reset pin 42 pushes the tail end 32b of the stop claw 32 and the tail end 35b of the driving claw 35 so as to rotate the claw 32 and the claw 35 clockwise and counterclockwise against the force of the spring 33 and the spring 38 respectively. Accordingly, the tip end claw portions 32a and 35a disengage from the ratchet wheel 23, so that by the force of the springs 25 and 17, the cam 22, the rachet wheel 23 and the head carrier 14 return to the respective initial positions determined by the engagement of the stopper pin 24 of the ratchet wheel 23 with the stopper 26.

Figure 4:
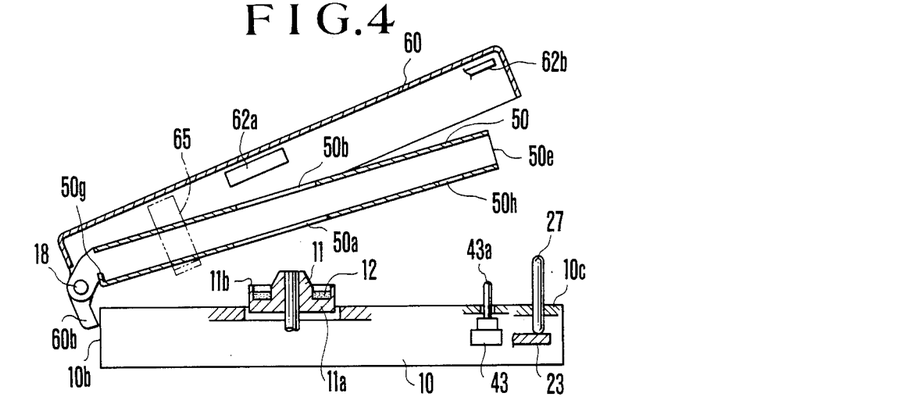
FIGS. 4, 5 and 6 illustrate various states of the apparatus shown in FIGS. 2A, 2B and 2C.
Figure 5:
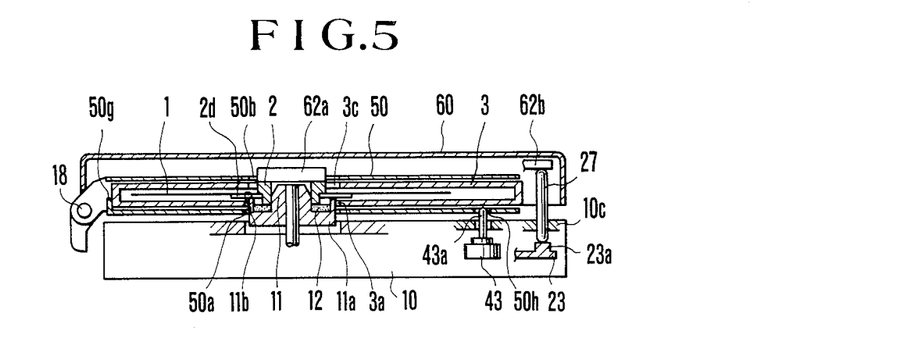
Figure 6:
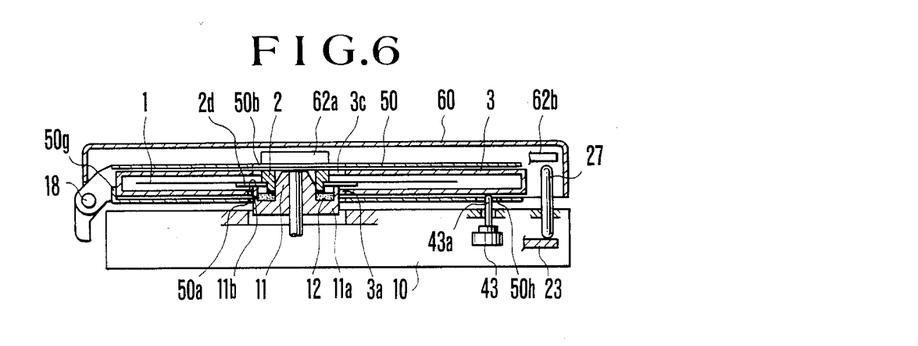

FIGS. 4 to 6 illustrate various operation states of the above-mentioned apparatus. FIG. 4 shows a state in which the outer cover 60 is opened relative to the body 10. In this state, by the force of the spring 19 the outer cover 60 is urged to turn in the counterclockwise direction relative to the body 10, namely in the opening direction, however, since one end 60b of the outer cover 60 abuts on a side portion 10b of the body 10, the outer cover 60 is kept at the position shown in FIG. 4. On the other hand, at this time, the holder 50 is urged to turn by the spring 20 in the clockwise direction relative to the outer cover 60, however, since a tip end of the engaging member 65 of the outer cover 60 engages with the holder 50, the holder 50 is also kept at the position shown in FIG. 4. In this state, when the cassette 3 is inserted into the holder 50 until it is restricted by a restriction portion 50g and the outer cover 60 is closed, the state shown in FIG. 6 appears. Further, the outer cover 60 is latched to the body 10, for example, by suitable means described later in FIG. 9. In this state, as shown in the drawings, the connecting rod 27 is at the downward position and does not act upon the tail end 62b of the pressure member 62. Thus, as shown in FIG. 2A, since the pressure member 62 has been rotated clockwise around the shaft 63, the tip end pressure portion 62a is not in contact with the center hub 2.

Figure 7:
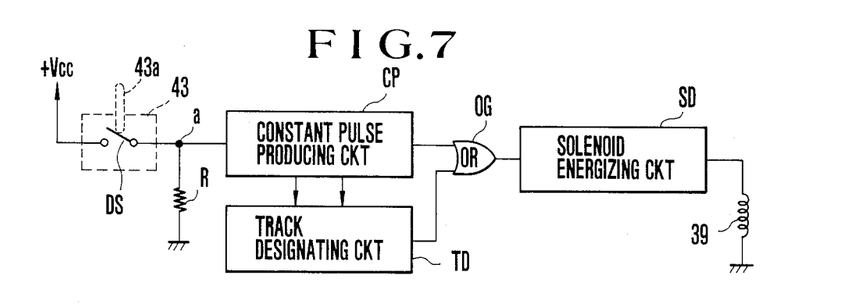
FIG. 7 is a block diagram showing an example of a control circuit system for the head moving means.

The operation of the pressure member 62 in this state is effected as follows. When, as described above, the cassette 3 is inserted into the holder 50 and the holder 50 is lowered down to a predetermined cassette mounting position as shown in FIG. 6, a cassette mounting detector 43 (FIGS. 4 to 6) provided on the side of the body 10 detects by a detecting projection 43a through a detection hole 50h of the holder 50 whether the cassette 3 is mounted at the predetermined position. As shown in FIG. 7, the detector 43 has a normally open type detecting switch DS to be closed when the detecting projection 43a is pushed down by the lower surface of the cassette 3. This detecting switch DS is connected to a power source +Vcc and a circuit ground via a resistor R. Thus, when the switch DS is closed, the potential at the connecting point "a" between the switch DS and the resistor R becomes high, in response to which a constant pulse producing circuit CP produces a predetermined number of pulses of a constant frequency. These pulses are supplied to a solenoid energizing circuit SD through an OR gate OG. The energizing circuit SD supplies a current to the solenoid 39 for a predetermined time once every time the pulse is supplied to the circuit SD. Thus, the ratchet wheel 23 is rotated by the number of pulses supplied to the energizing circuit SD. Here, the number of pulses produced from the constant pulse producing circuit CP is selected in such a manner that within the rotation of the ratchet wheel 23 by the pulses the convex cam portion 23a of the ratchet wheel 23 pushes up the connecting rod 27 and thereafter this pushing-up is released.

FIG. 5 shows an operation state in which the connecting rod 27 has been pushed up by the convex cam portion 23a. In this state, the pressure member 62 is forcedly rotated by the connecting rod 27 and the tip end pressure portion 62 presses the center hub 2 against the driving shaft 11 until the attraction plate 2d comes into contact with the fringe surface 11b of the flange portion 11a of the driving shaft 11. Further, a superflous movement of the connecting rod 27 to the pressure member 62 at this time is absorbed by the elasticity of the pressure member 62. Further, by selecting the number of the driving pulses produced from the constant pulse producing circuit CP in FIG. 7 in such a manner that when the latchet wheel 23 is rotated by the pulses the head 13 is moved to the position corresponding to a predetermined recording track, for example, the first recording track, the pressure member 62 resumes the state shown in FIG. 6 at the time of recording or reproduction, so that the pressure member 62 does not act as any load on the rotating driving shaft 11, which contributes to realization of a compact rotation driving source. In addition, in the construction of the circuit system in FIG. 7, the head position at this time can be selected as desired. Namely, if a desired track address is set at a track designating circuit TD in advance, the track designating circuit TD produces driving pulses of the number necessary for moving the head 13 to the set track address after the constant pulse producing circuit CP has produced the predetermined number of pulses. These driving pulses are supplied to the solenoid energizing circuit SD through the OR gate OG, and thus after the constant pulse producing circuit CP has produced the pulses the solenoid energizing circuit SD energizes the solenoid 39 in response to the pulses produced from the track designating circuit TD. Accordingly, the head 13 is moved to the position corresponding to the designated track.

Figure 8:
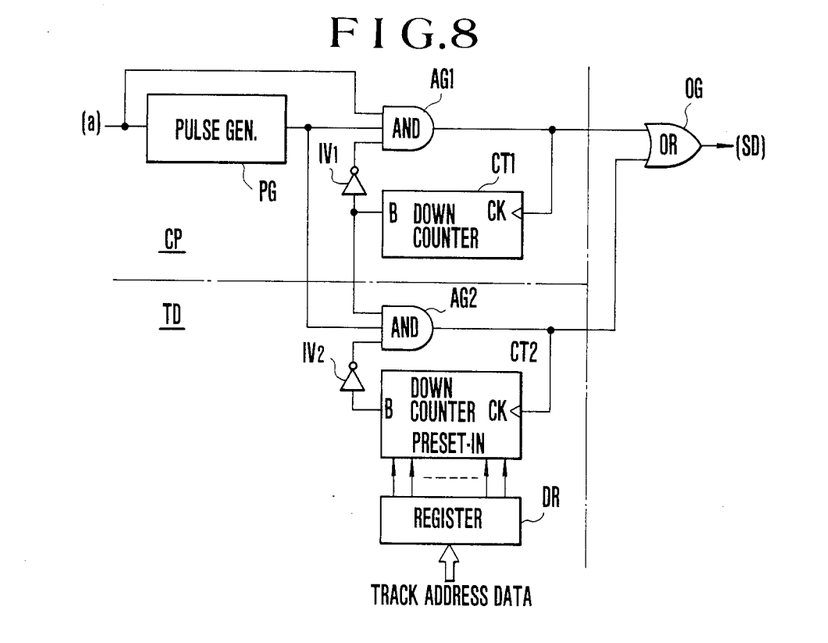
FIG. 8 is a block diagram showing an embodiment of essential circuits in FIG. 7.

The constant pulse producing circuit CP and the track designating circuit TD shown in FIG. 7 can be constructed, for example, a shown in FIG. 8. Namely, the constant pulses producing circuit CP includes a pulse generator PG, an AND gate AG1, a down counter CT1 and an inverter IV1, which are connected as shown in FIG. 8. Namely, when a potential at the connecting point "a" becomes high with the closure of the detecting switch DS in FIG. 7, the pulse generator PG starts to produce the above pulses of a constant frequency, which are supplied to the AND gate AG1 together with the potential at the connecting point "a" and an output of the inverter IV1 which inverses an output signal from a borrow output terminal B of the down counter CT1. Here, the down counter CT1 is so connected as to make the borrow output high at the time when the output pulses produced from the AND gate AG1 have been counted by the above predetermined number. Consequently, because the output of the inverter IV1 is high until the down counter CT1 has counted the predetermined number of the pulses, the AND gate AG1 supplies the pulses produced from the pulse generator PG to the OR gate OG and the down counter CT1. And the AND gate AG1 stops supplying the pulses at the time when the output of the inverter IV1 becomes low as the down counter CT1 has counted the predetermined number of pulses and the borrow output becomes high. Thus, in response to the high level potential at the connecting point "a", the above-mentioned predetermined number of pulses are produced.

On the other hand, the track designation circuit TD includes an AND gate AG2, a presettable down counter CT2, a data register DR and an inverter IV2 and has a connection similar to that of the constant pulse producing circuit CP as shown in FIG. 8. Namely, the AND gate AG2 receives the pulses from the pulse generator PG in the constant pulse producing circuit CP, the output signal from the borrow output terminal B of the down counter CT1 and the output of the inverter IV2 which inverses the output signal from the borrow output terminal B of the presettable down counter CT2. Here, the presettable down counter CT2 is connected in such a manner that when it has counted the output pulses of the AND gate AG2 by the number set at the data register DR the borrow output becomes high. Of course, data concerning a desired track address is stored in the data register DR. Consequently, the AND gate AG2 supplies the pulses whose number corresponds to the output of the data register DR after the constant pulse producing circuit CP has produced the predetermined number of pulses. The output pulses of the AND gate AG2 are supplied to the OR gate OG.

According to the above-mentioned construction, the pressure member 62 is operated depending on the operation of moving means (21, 22, 23, 32, 35, 39, etc.) for moving the head 13, so that the operability of the apparatus is not lowered. Further, the pressure member 62 pushes the center hub 2 during the period the head 13 moves from the reset position to the predetermined position and after that stops pushing, so that the moving of the head 13 at the time of recording or reproduction is never influenced disadvantageously.

Although, in the above apparatus, by the operation of the convex cam portion 23a provided on the ratchet wheel 23 and the connecting rod 27, the pressure member 62 pushes the center hub 2 during the period the head 13 moves to the predetermined position, and after that stops pushing, it is possible to construct the apparatus in such a manner that the pressure member 62 pushes the center hub 2 when the outer cover 60 is closed, and releases the pushing according to the operation of the head moving means, for example, before the head 13 reaches the predetermined position. For this purpose, for example, instead of the convex cam portion 23a, an even projection can be provided on a portion of the ratchet wheel 23 which is opposed to the connecting rod 27 when the outer cover 60 is closed, and a cam surface having a downward inclined portion can be provided on the left (in FIG. 2C and FIG. 3) side of the even projection. Further, as another modification, only the pressing operation of the pressure member 62 may be associated with the head moving means and the release from the pressing operation may be made by other means. Further, in the case of the embodiment of the present invention, the present invention is applied, by way of example, to an apparatus utilizing the side pressure and the magnetic attracting force between the rotation driving shaft 11 and the center hub 2 shown in FIG. 1 in order to mount the disc 1 on the driving shaft 11. However, the present invention can be applied to other apparatuses and further applied alone without using together with other mounting means.

Further, if the outer cover 60 itself is varied so as to hold the cassette 3, the holder 50 can be omitted.

Figure 9:
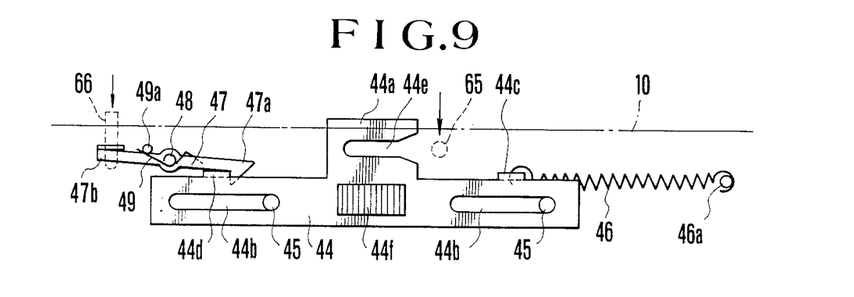
FIG. 9 shows an example of latching means to the outer cover.

Lastly, an example of means for latching the outer cover 60 at the closed state onto the body 10 will be described with reference to FIG. 9.

In the drawing, 44 is a latching member having a hook portion 44a for latching the outer cover 60 at the closed state. Guide pins 45 secured on a suitable portion of the body 10 are engaged in slots 44b of the latching member 44. Accordingly, the latching member 44 is mounted on a part of the body 10 so as to be movable to the right and left in the drawing and is urged to the right in the drawing by a spring 46 hung between a spring hanging portion 44c and a fixed pin 46a. In the state shown in the drawing, a tip end hook portion 47a of an arresting member 47 arrests an arm portion 44d of the latching member 44 at the left end of the movement, therefore the latching member 45 is arrested against the force of the spring 46. The arresting member 47 is rotatably supported by a shaft 48 at a suitable position of the body 10 and is urged by a spring 49 in the clockwise direction. A spring hanging pin 49a restricts the clockwise rotation of the arresting member 47. On the other hand, the outer cover 60 is provided with a release pin 66 for releasing the arrest of the arm portion 44d of the latching member 44 by the hook portion 47a of the arresting member 47. That release is effected in such a manner that when the outer cover 60 is closed to the predetermined position shown in FIG. 6, the release pin 66 pushes a tail end portion 47b of the arresting member 47 and turns the arresting member 47 counterclockwise against the force of the spring 49. Further, the outer cover 60 is provided with a latch pin to be engaged in a slot 44e of the hook portion 44a of the latching member 44 at the time of the release.

Thus, when the outer cover 60 is closed as shown in FIG. 6, the arrest of the latching member 44 by the arresting member 47 is released by the release pin 66 provided on the outer cover 60 and the latching member 44 is moved by the spring 46 to the right. At this time, the hook portion 44a of the latching member 44 arrests the latch pin 65 of the outer cover 60 by the slot 44e, so that the outer cover 60 is latched at the closed state as shown in FIG. 6.

Further, by moving the latching member 44 to the left against the force of the spring 46 through an operation knob 44f provided on the latching member 44, it is possible to open the outer cover 60, and at this time the latching member 44 is again arrested by the arresting member 47 at the left end of the movement.

As described in detail, according to the present invention, since control means for controlling pressing means for pressing a mounting portion of a record bearing medium against a record bearing medium rotation driving portion in response to the operation of head moving means for moving a recording or reproducing head is provided, the superfluous control operation of the control means is not necessary, which contributes to realization of a simple construction. Thus, in accordance with the embodiments, a record bearing medium can be mounted on the rotation driving portion surely and correctly without the superfluous operation, and the pressing means gives no superfluous load to the rotation driving portion at the time of recording or reproduction.

What is claimed is:

1. A recording and/or reproducing apparatus arranged to use a disc-shaped record bearing medium having an engaging portion, said apparatus comprising:
   (A) recording and/or reproducing head means for recording signals on and/or reproducing recorded signals from said record bearing medium;
   (B) rotating means for rotating the medium relative to said head means, said rotating means being engageable with said engaging portion of the medium and having a receiving surface for receiving thereon the engaging portion of the medium;
   (C) moving means operable for moving said head means relative to the medium along the surface of said medium;
   (D) pressing means operable for pressing said engaging portion of the medium against said receiving surface of the rotating means; and
   (E) control means for time-related control of said moving means and said pressing means, said control means including
      (1) detection means for detecting that said medium is loaded at a predetermined position,
      (2) drive means for operating said moving means a predetermined amount upon such detection by said detection means, and
      (3) releasing means for releasing the pressing operation of said pressing means depending upon the operation of said moving means effected by said drive means.

2. The apparatus according to claim 1, wherein said control means is arranged to selectively operate said pressing means in the course of such operation of said drive means and to discontinue such selective operation of said drive means upon completion of said operation of said drive means.

3. The apparatus according to claim 1, further comprising:
   holder means for holding the medium, said holder means being movable between a first position for receiving the medium and a second position for positioning the received medium at a predetermined position relative to said rotating means; and
   openable and closable cover means for said holder means;
   said holder means being arranged to be moved between said first and said second positions in response to the opening and the closing of said cover means; said pressing means being provided on a portion of said cover means; and said control means being arranged to be enabled to control said pressing means when said cover means is closed.

4. The apparatus according to claim 3, wherein said detection means produces a detection signal upon detecting that the medium is positioned at said predetermined position by said holder means; said apparatus further including:
circuit means responsive to said detection signal for causing said drive means to move said head means to a predetermined position by said moving means; said control means being arranged to control said pressing means when said moving means moves said head means to said predetermined position.

5. The apparatus according to claim 3, further comprising:
latching means for latching said cover means when said cover means is closed.

6. A recording and/or reproducing apparatus arranged to use a disc-shaped record bearing medium having an engaging portion, said apparatus comprising:
(A) recording and/or reproducing head means for recording signals on and/or reproducing recorded signals from said record bearing medium;
(B) rotating means for rotating the medium relative to said head means, said rotating means being engageable with said engaging portion of the medium and having a receiving surface for receiving thereon the engaging portion of the medium;
(C) head moving means operable for moving said head means relative to the medium along the surface of said medium;
(D) holder means for holding the medium, said holder means being movable between a first position for receiving the medium and a second position for positioning the received medium at a predetermined position relative to said rotating means;
(E) holder moving means for moving said holder means from said first to said second position;
(F) pressing means operable for pressing said engaging portion of the medium against said receiving surface of the rotating means, said pressing means being enabled for such operation thereof when said holder means is moved to said second position by said holder means; and
(G) control means for time-related control of said head moving means and said pressing means, said control means including
(1) detection means for detecting that said medium is loaded at a predetermined position,
(2) drive means for operating said moving means a predetermined amount upon such detection by said detection means, and
(3) releasing means for releasing the pressing operation of said pressing means depending upon the operation of said moving means effected by said drive means.

7. The apparatus according to claim 6, wherein said detection means produces a detection signal upon detecting that the medium is positioned at said predetermined position by said holder means, said control means comprising circuit means for operating said head moving means to move said head means to a predetermined position relative to said medium;
said control means operating said pressing means when said head moving means moves said head to said predetermined position and then discontinuing such operation of said pressing means.

8. The apparatus according to claim 7, further comprising:
latching means for latching said holder means at said second position.

9. The apparatus according to claim 8, wherein said holder moving means includes;
openable and closable cover means for said holder means;
said holder means being arranged to be moved between said first and said second positions in response to the opening and the closing of said cover means; said pressing means being provided on a portion of said cover means; and said operate means being arranged to be enabled to control said pressing means when said cover means is closed.

10. The apparatus according to claim 9, wherein said latching means is arranged to latch said holder means through said cover means.

11. An apparatus for recording signals on and/or reproducing recorded signals from a flexible magnetic disc housed in a cassette and having a center hub attached at a central portion thereof and provided with an engaging hole, said cassette having a window for exposing a portion of said disc, said apparatus comprising:
(A) a magnetic head for recording signals on and/or reproducing recorded signals from the disc;
(B) a spindle engageable with said engaging hole of the center hub of the disc, said spindle having a flange portion for receiving thereon said center hub;
(C) a cassette holder for holding said cassette, said cassette holder being movable from a first position to a second position for causing said disc within the held cassette to gain access to said head through said window of the cassette;
(D) a pressure member for pressing said center hub of the disc against said flange portion of the spindle;
(E) operation means for moving said holder from said first to said second position and for enabling operation of said pressure member;
(F) a head moving mechanism for moving said head relative to the disc along a surface of said disc; and
(G) control means for time-related control of said head moving mechanism and said pressure member said control means including
(1) detection means for detecting that said disc is loaded at a predetermined position,
(2) drive means for operating said head moving mechanism a predetermined amount along the surface of said disc upon such detection by said detecting means, and
(3) releasing means for releasing the pressing operation of said pressing means depending upon the operation of said moving means effected by said drive means.

12. The apparatus according to claim 11, wherein said detection means produces a detection signal upon said detection and wherein said drive means is responsive to said detection signal for driving said head moving mechanism to move said head to a predetermined position from a reset position.

13. An apparatus for recording signals on and/or reproducing recorded signals from a flexible magnetic disc housed in a cassette and having a center hub attached at a central portion thereof and provided with an engaging hole, said cassette having a window for exposing a portion of said disc, said apparatus comprising:

(A) a magnetic head for recording signals on and/or reproducing recorded signals from the disc;

(B) a spindle engageable with said engaging hole of the center hub of the disc, said spindle having a flange portion for receiving thereon said center hub;

(C) a cassette holder for holding said cassette, said cassette holder being movable from a first position to a second position for causing said disc within the held cassette to gain access to said head through said window of the cassette;

(D) an outer cover for said holder, said cover being movable from an opened to a closed position to move the holder from said first position to said second position;

(E) a pressure member for pressing said center hub of the disc against said flange portion of the spindle, said pressure member being arranged on a portion of said cover;

(F) moving means for moving said head relative to the disc along a surface of said disc; and (G) control means for time-related control of said pressure member and said moving means when said cover is at the closed position, said control means including drive means for moving said moving means a predetermined amount along the surface of said disc and releasing means for releasing the pressing operation of said pressure member depending upon the operation of said moving means effected by said drive means.

14. The apparatus according to claim 13, further comprising:

a detection member for producing a detection signal upon detecting that said holder is moved to said second position while holding the cassette; and circuit means responsive to said detection signal for causing said moving means to move said head to a predetermined position form a reset position;

said control means operating said pressure member when said moving means moves said head to said predetermined position.

15. An apparatus for recording signals on and/or reproducing recorded signals from a flexible magnetic disc housed in a cassette and having a center hub attached at a central portion thereof and provided with an engaging hole, said cassette having a window for exposing a portion of said disc, said apparatus comprising:

(A) a magnetic head for recording signals on and/or reproducing recorded signals from the disc;

(B) a spindle engageable with said engaging hole of the center hub of the disc, said spindle having a flange portion for receiving thereon said center hub;

(C) a cassette holder for holding said cassette, said cassette holder being movable from a first position to a second position for causing said disc within the held cassette to gain access to said head through said window of the cassette;

(D) an outer cover for said holder, said cover being movable from an opened to a closed position to move the holder from said first position to said second position;

(E) a pressure member for pressing said center hub of the disc against said flange portion of the spindle, said pressure member being arranged on a portion of said cover;

(F) moving means for moving said head relative to the disc along a surface of said disc; and (G) control means for controling said pressure member and said moving means when said cover is at the closed position, said control means including drive means for moving said moving means a predetermined amount along the surface of said disc and means responsive to said drive means for selectively operating said pressure member and then discontinuing operation of said pressure member.

16. The apparatus according to claim 15, further comprising:

a detection member for producing a detection signal upon detecting that said holder is moved to said second position while holding the cassette; and circuit means responsive to said detection signal for causing said moving means to move said head to a predetermined position from a reset position;

said selectively operating means operating said pressure member selectively at the time when said moving means moves said head to said predetermined position.

* * * * *